United States Patent [19]

Shimada et al.

[11] Patent Number: 5,414,691
[45] Date of Patent: May 9, 1995

[54] OPTICAL DISK, METHOD OF MANUFACTURING THE SAME AND METHOD OF RECORDING THE SAME

[75] Inventors: Kunihiko Shimada; Shuichi Yanagisawa; Satoru Tanaka, all of Tsurugashima, Japan

[73] Assignee: Pioneer Electronic Corporation, Tokyo, Japan

[21] Appl. No.: 165,932

[22] Filed: Dec. 14, 1993

[30] Foreign Application Priority Data

Dec. 16, 1992 [JP] Japan .................................. 4-336393

[51] Int. Cl.⁶ .......................... G03C 1/00; G11B 7/24
[52] U.S. Cl. ............................... 369/275.2; 369/275.3
[58] Field of Search ......................... 369/275.1-275.4; 430/945; 428/64, 65

[56] References Cited

U.S. PATENT DOCUMENTS

| | | | |
|---|---|---|---|
| 4,646,278 | 2/1987 | Okano | 369/32 |
| 4,961,183 | 10/1990 | Tinet | 369/275.4 |
| 5,215,800 | 6/1993 | Daido et al. | 428/64 |

Primary Examiner—Paul M. Dzierzynski
Assistant Examiner—Don Wong
Attorney, Agent, or Firm—Young & Thompson

[57] ABSTRACT

A recordable optical disk is provided with: a disk substrate having a recording surface; a track portion, which is coaxially or spirally arranged on the recording surface, and to which the information is recorded by irradiating a light beam modulated in correspondence with the information, thereonto; and an interval portion disposed on the recording surface between adjacent turns of the track portion on the recording surface. The reflection coefficient of the interval portion is higher than the reflection coefficient of the track portion.

5 Claims, 4 Drawing Sheets

RELATIONSHIP BETWEEN PIT AND REFLECTION COEFFICIENT IN ORDINARY LD

OPTICAL DISK, METHOD OF MANUFACTURING THE SAME AND METHOD OF RECORDING THE SAME

BACKGROUND OF THE INVENTION

1. Field of the Invention

The present invention relates to an optical disk, a method of manufacturing the same and a method of recording the same. More particularly, it relates to an optical disk, to which information can be recorded by a light beam.

2. Description of the Related Art

There is an optical disk reproducing apparatus as an apparatus which reproduces optical disks, such as a LD (Laser Disk) and a CD (Compact Disk). This kind of optical disk reproducing apparatus irradiates a light beam to the optical disk and reproduces information recorded on the optical disk on the basis of the reflection light from the optical disk. FIG. 1 indicates a relationship between the pit and a reflection coefficient in an ordinary disk.

In FIG. 1, a recording surface of an ordinary LD is partially shown at the lower half of the figure, while the reflection coefficient corresponding to the recording surface is shown at the upper half of the figure. Each of track portions 10 is disposed in the direction of the track. Pits 10a and 10b, which indicate information, are formed on each of the track portions 10. Each area between adjacent track portions 10, is a flat interval portion (land portion) 12. Here, a reflection coefficient (an amount of returned light) of each portion, is considered. The reflection coefficient of the track portions 10 is low due to the refraction of the light beam by the pits 10a and 10b (As indicated by the reference numeral 11L). On the other hand, the reflection coefficient of the interval portions 12 is high due to the reflection of the light beam (as indicated by the reference numeral 13H).

In the reproducing apparatus for the ordinary LD, the tracking control is performed by use of the above mentioned difference in the reflection coefficient, so as to adjust the light beam to each of the track portions 10 having the low reflection coefficient. Namely, in the tracking control by the three beam method, the reflection coefficient of the interval portions 12 having no pit, and the reflection coefficient of the track portions 10 are compared with each other, and the portion having the low reflection coefficient is recognized as the track portion 10. Thereby, the light beam is adjusted to the track portion 10.

In the above mentioned ordinary LD, the information is recorded beforehand. On the other hand, there is a recordable optical disk onto which a user can record information arbitrarily. There is a Recordable-LD described as a R-LD, which is an example of such a recordable optical disk.

In the R-LDs using the dye of phthalocyanine series and cyanine series as a recording layer, there is a R-LD which high and low reflection coefficients are opposite to that of the above mentioned ordinary LD. Namely, at the track portion, the reflection coefficient is high, while at the interval portion between two adjacent track portions, the reflection coefficient is low. This feature is explained with reference to FIG. 2.

FIG. 2 indicates a relationship between the pit and the reflection coefficient in such a R-LD. At the track portions 10 having pit 10a and 10b, the reflection coefficient (amount of the return light) is high (as indicated by the reference numeral 11H). On the other hand, at the interval portions 12, the reflection coefficient is low (as indicated by the reference numeral 13L). Therefore, when the tracking of the light beam is carried out, it becomes necessary to adjust the light beam to the track portions 10 having the high reflection coefficient. This tracking characteristic is contrary to that of the ordinary LD of FIG. 1. For this reason, the R-LD cannot be reproduced by the reproducing apparatus for the ordinary LD. In order to reproduce the R-LD, it becomes necessary to invert the tracking characteristic within the reproducing apparatus.

SUMMARY OF THE INVENTION

It is therefore an object of the present invention to provide a recordable optical disk and a recording method of the recordable optical disk, in which the tracking characteristic is the same as in the ordinary optical disk, and thus which can be reproduced by ordinary optical disk reproducing apparatus.

The above object of the present invention can be achieved by a recordable optical disk, to which information can be recorded by irradiating a light beam. The recordable optical disk is provided with: a disk substrate having a recording surface; a track portion, which is coaxially or spirally arranged on the recording surface, and to which the information is recorded by irradiating a light beam modulated in correspondence with the information; and an interval portion disposed on the recording surface between adjacent turns of the track portion on the recording surface, the reflection coefficient of the interval portion being higher than the reflection coefficient of the track portion.

According to the recordable optical disk of the present invention, the optical disk is constituted so that the reflection coefficient of the interval portion becomes higher than the reflection coefficient of the track portion. Therefore, it becomes possible to adjust the light beam to the track portion having the low reflection coefficient, in the same manner as the case of the ordinary LD.

In one aspect of the present invention, it is preferable that the information is recorded in the form of a pit formed on the track portion. In this case, the reflection coefficient of the pit is higher than the reflection coefficient of the interval portion, and an average reflection coefficient of the pit and the portion other than the pit of the track portion is lower than the reflection coefficient of the interval portion. Consequently, the tracking characteristic of this recordable optical disk is the same as the ordinary optical disk, and thus it can be reproduced by a reproducing apparatus for the ordinary optical disk.

The above object of the present invention can be also achieved by a method of manufacturing a recordable optical disk, to which information can be recorded by irradiating a light beam. The manufacturing method is provided with the steps of: preparing a disk substrate having a recording surface; forming a track portion coaxially or spirally on the recording surface and an interval portion on the recording surface between adjacent turns of the track portion on the recording surface; and irradiating a light beam, which is not modulated, onto the interval portion such that the reflection coefficient of the interval portion becomes higher than the reflection coefficient of the track portion.

Thus, the above mentioned recordable optical disk can be manufactured by the manufacturing method of the present invention.

The above object of the present invention can be also achieved by a method of recording information on a recordable optical disk, to which information can be recorded by irradiating a light beam, and which includes a disk substrate having a recording surface, a track portion coaxially or spirally arranged on the recording surface and an interval portion disposed on the recording surface between adjacent turns of the track portion on the recording surface. The recording method is provided with the steps of: irradiating a light beam, which is not modulated, onto the interval portion such that the reflection coefficient of the interval portion becomes higher than the reflection coefficient of the track portion; and irradiating a light beam, which is modulated in correspondence with the information, onto the track portion.

Thus, the recordable optical disk, which is recorded by the recording method of the present invention, has the same tracking characteristic as the ordinary optical disk, and thus can be reproduced by a reproducing apparatus for the ordinary optical disk.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

Figure 3:
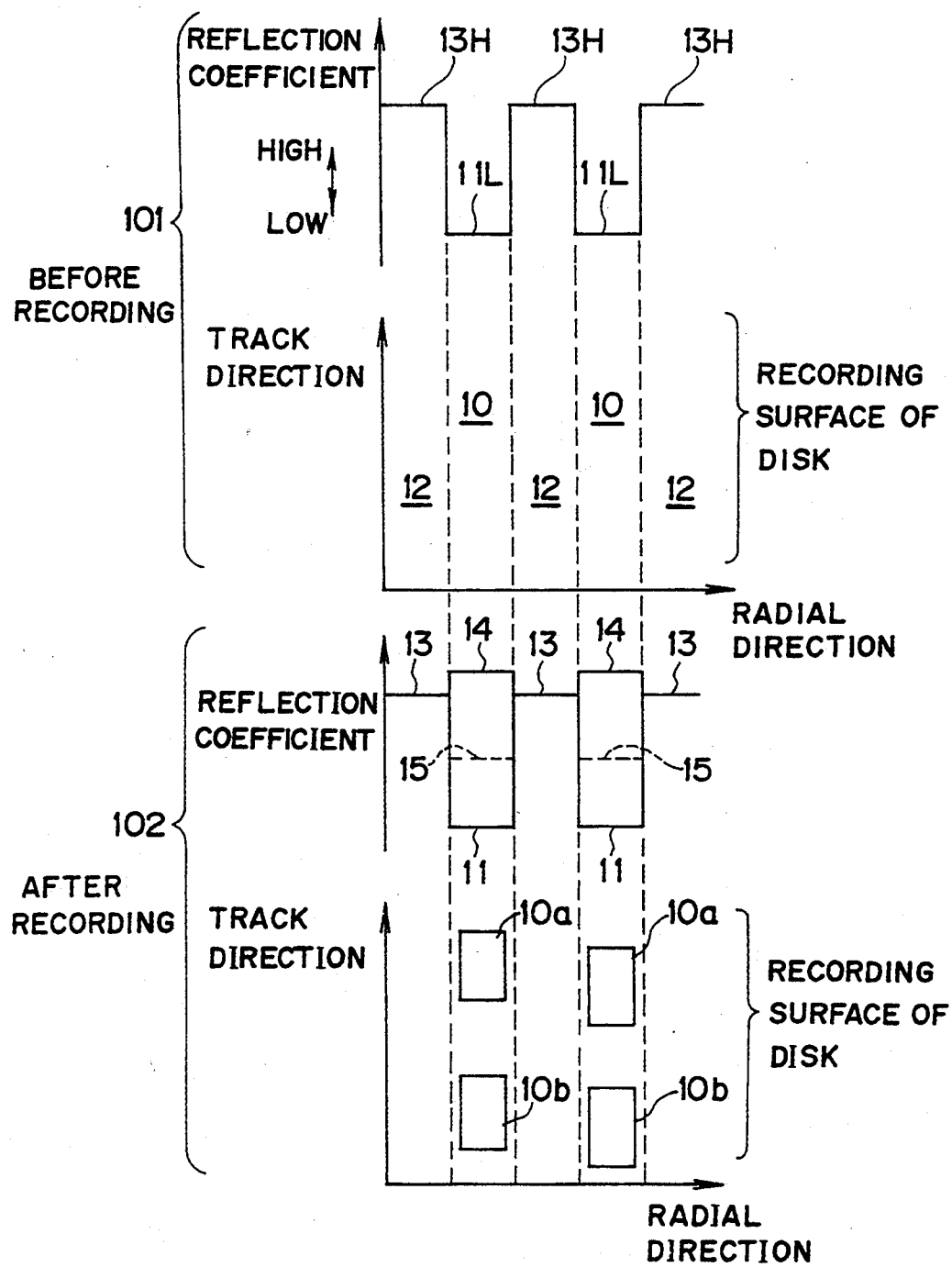
FIG. 3 is a diagram showing a relationship between a pit and a reflection coefficient in a R-LD of the embodiment of the present invention.

FIG. 3 shows a relationship between a pit and a reflection coefficient in a R-LD of an embodiment of the present invention. In FIG. 3, the diagram 101 (upper portion of the figure) indicates the condition before recording, while the diagram 102 (lower portion of the figure) indicates the condition after recording.

As shown in the diagram 101, the track portions 10 are disposed along the track direction. The track portion 10 is coaxially or spirally arranged on a recording surface of a disk substrate of the R-LD. The areas between the adjacent track portions 10 are interval portions 12. A non-modulated light beam is irradiated beforehand to the interval portions 12 as a pretreatment. As the result, the reflection coefficient 13H of the interval portions 12, is higher than the reflection coefficient 11L of the track portions 10.

By irradiating a modulated light beam to the track portions 10, which is in the condition before recording shown in the diagram 101, and thus forming pits 10a and 10b on the track portions 10, the information can be recorded to the track portions 10, as shown in the diagram 102. Namely, the portions in the track portions 10 of the diagram 101, to which the light beam is irradiated, become pits 10a and 10b of the diagram 102. The reflection coefficient of the pits 10a and 10b is high as indicated by the reference numeral 14 in the diagram 102. On the other hand, the reflection coefficient of the portions in the track portions 10 of the diagram 101, to which the light beam is not irradiated, is kept low as indicated by the reference numeral 11 in the diagram 102. As a result, information is recorded to the track portions 10.

Here, it should be remarked that, as indicated by the reference numeral 14, the reflection coefficient is high after recording at the pits 10a and 10b of the track portions 10. However, the average reflection coefficient 15 of the reflection coefficient 14, where the pits 10a and 10b exist, and the reflection coefficient 11, where the light beam is not irradiated, is lower than the reflection coefficient 13 of the interval portions 12. Accordingly, the high and low relationship between the reflection coefficient of the track portions 10, and the reflection coefficient of the interval portions 12 in the R-LD of the present embodiment, is the same as the ordinary LD (see FIG. 1).

Figure 1:
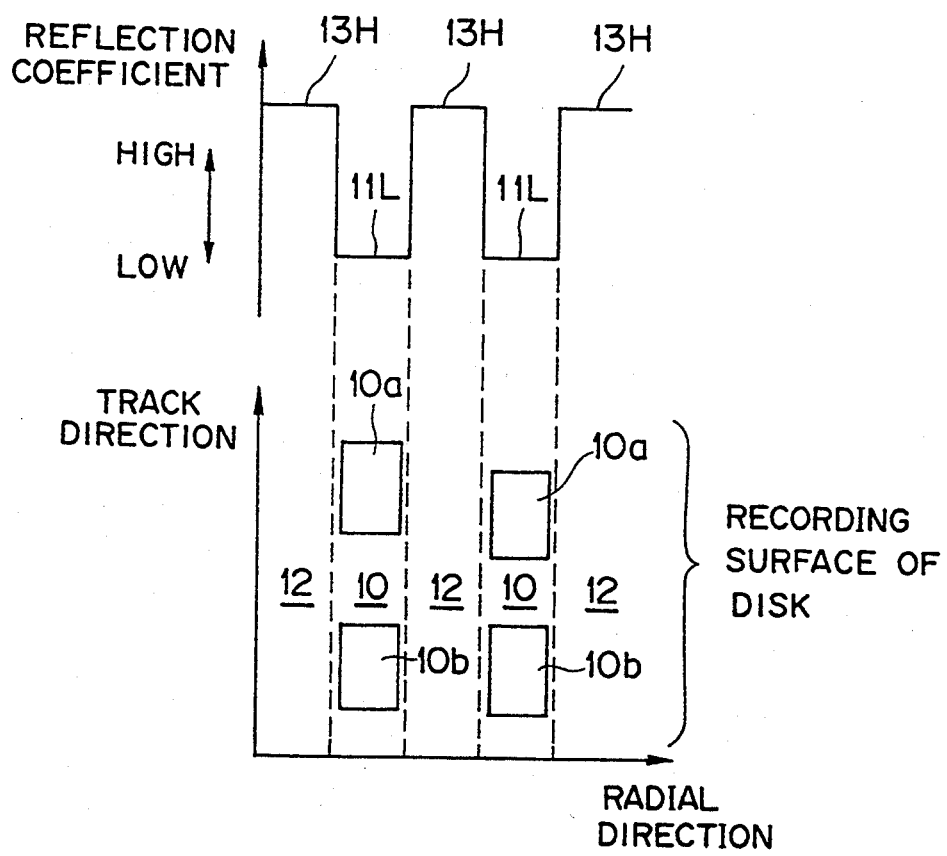
FIG. 1 is a diagram showing a relationship between a pit and a reflection coefficient in an ordinary LD.
Figure 2:
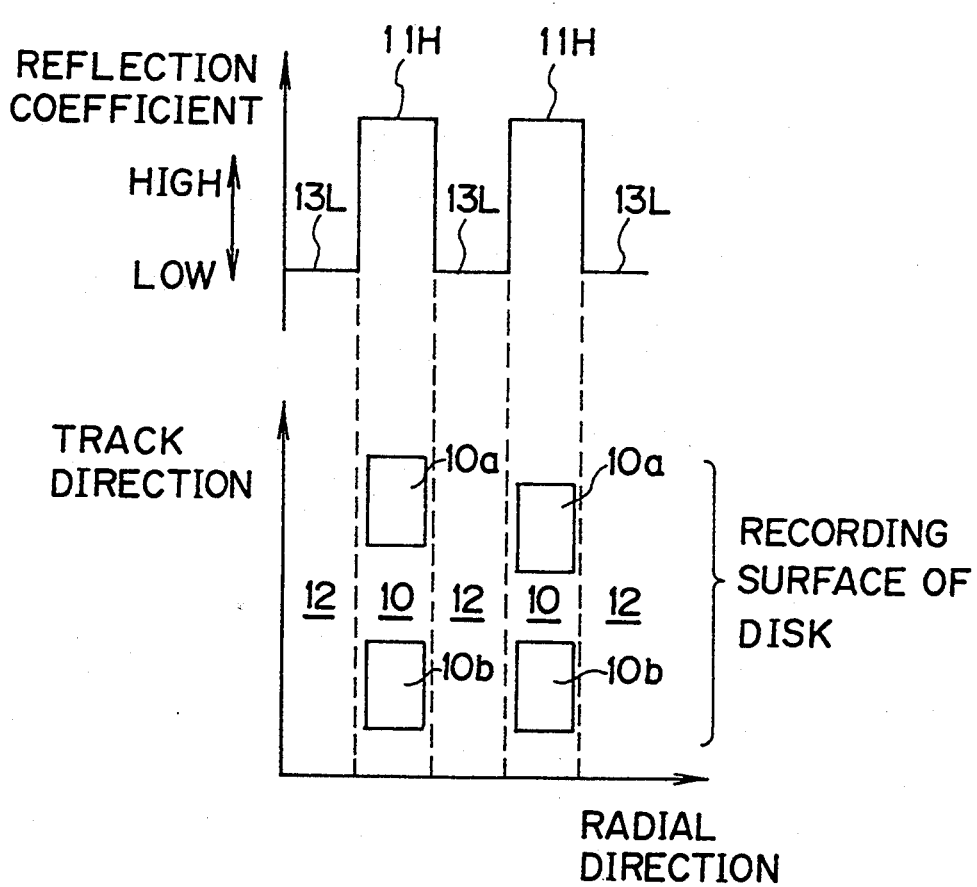
FIG. 2 is a diagram showing a relationship between a pit and a reflection coefficient in a R-LD of the related art.

Therefore, in order to track the light beam with respect to the R-LD of the present embodiment, what is necessary is just to adjust the light beam to the track portions 10, which have the reflection coefficient lower than the interval portions 12, in the same manner as the ordinary LD of FIG. 1. Therefore, the tracking control of the R-LD can be performed, and the R-LD can be reproduced by the three beam method with the same tracking characteristic as the ordinary LD. As a result, the R-LD can be reproduced by use of a reproducing apparatus for the ordinary LD, without inverting the tracking characteristic, and the interchangeability with the ordinary LD can be established in the reproducing apparatus.

Figure 4:
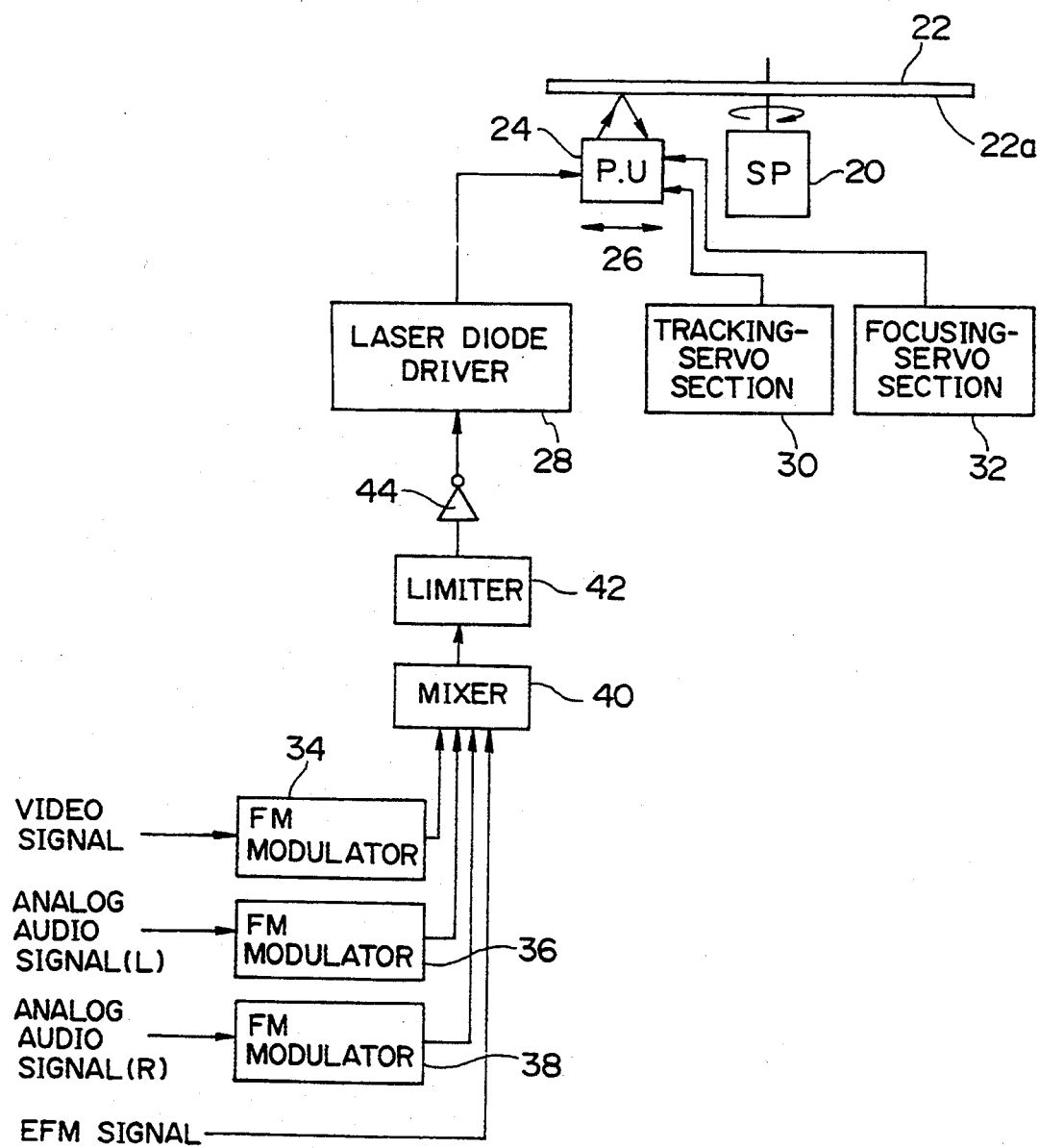
FIG. 4 is a block diagram of an optical disk recording apparatus for recording an R-LD of the embodiment of the present invention.

Nextly, FIG. 4 shows the construction of the optical disk recording apparatus. Here, the R-LD is used as the optical disk.

In FIG. 4, a R-LD 22, which is equal to the above described R-LD of FIG. 3., is set on a spindle motor 20, such that the R-LD 22 is rotated by a spindle motor 20. The R-LD 22 has a disk substrate and a recording surface 22a, which consists of a recording layer. Dye of phthalocyanine series or cyanine series may be used as this recording layer of this R-LD 22. An optical pickup unit 24 is disposed under the R-LD 22. The optical pickup unit 24 is constructed such that it can reciprocate in the directions of the arrows 26 i.e. in the radial direction of the R-LD 22. A laser diode driver 28 drives the laser diode in the optical pickup unit 24, so that the writing-in light beam from the laser diode is irradiated to the R-LD 22, and that the information is recorded on the R-LD 22. The tracking servo-control and the focus servo-control are performed with respect to the writing-in laser beam from the laser diode in the optical pickup unit 24, by a tracking-servo section 30 and a focusing-servo section 32, respectively.

Here, a video-signal, an analog audio-signal (L), an analog audio-signal (R), and an EFM (Eight to Fourteen Modulation) signal, are used as the information to be recorded on the R-LD 22. The video-signal, the analog audio-signal (L), and the analog audio-signal (R), are supplied to a mixer 40 through FM modulators 34, 36 and 38, respectively. On the other hand, the EFM signal is supplied to the mixer 40 directly. The information signals from the mixer 40 are supplied to a laser diode driver 28 through a limiter 42 and an inverter circuit 44. On the basis of the information signal from the inverter circuit 44, the laser diode driver 28 drives the laser diode in the optical pickup unit 24, so that the information is recorded to the R-LD 22 by the write-in light beam from the laser diode.

The operation to record the information to the R-LD 22 by use of the above mentioned optical disk recording apparatus, will be explained hereinbelow.

Firstly, the connection to the laser diode driver 28 from the inverter circuit 44 is cut off. And, the laser diode driver 28 drives the laser diode in the optical pickup unit 24, so that a non-modulated light beam (i.e. a light beam which is not modulated) from the laser diode is irradiated onto the interval portions between the track portions of the R-LD 22. As a result, the reflection coefficient of the interval portions becomes higher than that of the track portions (as indicated by the diagram 101 of FIG. 3).

After completing this pretreatment of the R-LD 22, the information is recorded to the track portion of the R-LD 22. Firstly, the inverter circuit 44 and the laser diode driver 28 are changed to be in the connected state. And, the laser diode driver 28 drives the laser diode in the optical pickup unit 24 in correspondence with the information signal from the inverter circuit 44, so a modulated light beam from the laser diode is irradiated onto the track portion of the R-LD 22. As a result, a pit is formed on the track portion. Namely, the information is recorded (as indicated by the diagram 102 of FIG. 3).

Here, as mentioned above, though the reflection coefficient of the track portion is high at the pit portion, it is lower than the reflection coefficient of the interval portion. Thus, since the tracking characteristic of the present embodiment is the same as that of the ordinary LD, the R-LD 22 to which the information is recorded, can be reproduced by the reproducing apparatus for the ordinary LD.

As described above in detail, according to the present embodiment, since the optical disk is constructed such that the reflection coefficient of the interval portions is higher than the reflection coefficient of the track portions, the recordable optical disk can be obtained which tracking characteristic is the same as the ordinary optical disk.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A recordable optical disk, to which information can be recorded by irradiating a light beam by an optical disk player, comprising:

a disk substrate having a recording surface;

a track portion coaxially or spirally arranged on the recording surface, and made of material having a reflection coefficient that is increased by irradiating a light beam thereonto so that the information is recordable on the irradiated track portion by irradiating the light beam modulated in correspondence with the information; and an interval portion disposed on the recording surface between adjacent turns of the track portion on the recording surface, the interval portion having a reflection coefficient higher than a reflection coefficient of the track portion in a condition before the information is recorded.

2. A recordable optical disk according to claim 1, wherein the track portion is made of material on which information is recordable in a form of a pit.

3. A recordable optical disk according to claim 2, wherein the track portion is made of material which, after recording, has a higher reflection coefficient at the pit than the reflection coefficient of the interval portion, and which has a lower average reflection coefficient of the track portion than the reflection coefficient of the interval portion.

4. A recordable optical disk according to claim 1, wherein the recording surface comprises one of phthalocyanine dye and cyanine dye.

5. A recordable optical disk according to claim 1, wherein the information comprises a video signal, an audio signal and an EFM (Eight to Fourteen Modulation) signal.

* * * * *